United States Patent
Kurosawa et al.

(10) Patent No.: US 7,555,184 B2
(45) Date of Patent: Jun. 30, 2009

(54) OPTICAL FIBER, END FACE STRUCTURE OF OPTICAL FIBER ASSEMBLY, AND OPTICAL CONNECTOR

(75) Inventors: Yoshinori Kurosawa, Hitachi (JP); Kazumasa Ohsono, Hitachi (JP); Yoshihisa Kato, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/984,404

(22) Filed: Nov. 16, 2007

(65) Prior Publication Data
US 2008/0317416 A1   Dec. 25, 2008

(30) Foreign Application Priority Data
Jun. 19, 2007   (JP) ............... 2007-161235

(51) Int. Cl.
*G02B 6/02* (2006.01)
(52) U.S. Cl. .................................... 385/123
(58) Field of Classification Search ........... None
See application file for complete search history.

(56) References Cited

U.S. PATENT DOCUMENTS

| | | | |
|---|---|---|---|
| 6,868,213 B2 | 3/2005 | Sasaoka et al. | |
| 2006/0204195 A1* | 9/2006 | Kurosawa et al. | 385/125 |
| 2008/0013905 A1* | 1/2008 | Bookbinder et al. | 385/124 |
| 2008/0124036 A1* | 5/2008 | Miyabe et al. | 385/125 |

FOREIGN PATENT DOCUMENTS

| | | |
|---|---|---|
| JP | 2002-323625 | 11/2002 |
| JP | 2006-126720 | 5/2006 |

* cited by examiner

*Primary Examiner*—Sung H Park
(74) *Attorney, Agent, or Firm*—McGinn IP Law Group, PLLC

(57) ABSTRACT

An optical fiber includes a core, a clad formed around the core, a plurality of holes being formed in the clad, and a UV curing optically-transparent resin which is filled in the holes and hardened. The UV curing optically-transparent resin has a Young's modulus of 8 to 500 MPa after hardening.

12 Claims, 3 Drawing Sheets

OPTICAL FIBER, END FACE STRUCTURE OF OPTICAL FIBER ASSEMBLY, AND OPTICAL CONNECTOR

The present application is based on Japanese Patent Application No. 2007-161235 filed on Jun. 19, 2007, the entire contents of which are incorporated herein by reference.

BACKGROUND OF THE INVENTION

1. Field of the Invention

This invention relates to an optical fiber which includes a plurality of holes around a core thereof, an end face structure that an end face of the optical fiber is connected to another optical fiber, and an optical connector to which an end portion of the optical fiber is bonded and fixed and which has a high reliability by sealing the holes at an end face of the optical fiber.

2. Description of the Related Art

FIG. 4 is a sectional view showing a holey optical fiber (Hole Assisted Fiber: HAF) having 6 holes.

As shown in FIG. 4, the HAF 40 includes a core 41, a clad 42 covering the core 41, and a plurality of holes 43 (e.g., 6 holes in FIG. 4) formed in the clad 42 around the core 41.

For example, the HAF 40 has a core diameter of 10 μm and a clad diameter of 125 μm. Further, Germanium is added to the core 41 similar to a typical (solid) single mode fiber (SMF), and the core 41 has a relative refractive index difference of 0.35% with respect to the clad 42 made of a pure silica glass. Around the core 41, the holes 43 having an internal diameter of about 10 μm are formed along with an entire length of the optical fiber at equal intervals with respect to a circumferential direction.

A feature of the HAF 40 is to have a high optical confinement into the core 41, since a refractive index of the holes 43 is almost 1.0 and an effective relative refractive index difference is extremely greater than that of a tipical SMF. Further, if the relative refractive index difference is great, a loss which arises if the HAF 40 is bent, is extremely small.

An optical fiber having holes such as a HAF 40 is "connectorized" (e.g., an optical fiber end face is fixed to an optical connector) after the holes of the optical fiber end are sealed. As a method therefor, there has been a method sealing by heating, and a method sealing by injecting an ultraviolet (UV) curing resin (e.g., disclosed in JP-A-2002-323625, hereinafter "patent document 1").

In more detail, after holes are destroyed (e.g., crushed) and sealed by locally heating an optical fiber by using a heating means (e.g., heater, or discharging electrode) while reducing a pressure from an edge of the holes by a vacuum pump, the holes are destroyed in the same manner at a location (the other end of the optical fiber) which is distant therefrom by a required length, and then both ends of the optical fiber are connected to desired connector components.

On the other hand, concerning a sealing method by UV curing resin, after a liquid UV curing resin (resin precursor) is injected from an optical fiber end face, the liquid resin precursor in the holes is hardened by irradiation of ultraviolet rays. In this case, a refractive index of the UV curing resin is greater than that of a material constituting a clad. After hardening, an optical fiber end portion filled by the resin is inserted into a hole of a ferrule, and fixed to the ferrule by an adhesive. Then, the optical fiber protruding from a ferrule end face is grinded (polished), and an optical connector process is completed.

A viscosity of the UV curing resin filled in the holes is more than 10 Pa·s, and preferably 60 Pa·s (e.g., as disclosed in JP-A-2006-126720, hereinafter "patent document 2"). With regard to an optical fiber of the patent document 2, a grinding process after hardening is not considered. Further, if a length (resin filling length) filled by a silicon adhesive as a UV curing resin is great, an internal bubble may occur during hardening. Consequently, the viscosity of the resin precursor is set relatively high so that the silicon adhesive can be controlled well within a relatively short range (resin filling length).

However, as shown in FIG. 5, the optical fiber disclosed in patent document 1 is a photonic crystal fiber (PCF) which has holes 52 which have a diameter of several μm and are formed around the center of the clad 51 having a uniform refractive index without the center thereof, so as to have a honeycomb structure and have layers equal to or more than 3 (e.g., 4 layers in FIG. 5), and in which the center surrounded by the multiple holes 52 is core 53. Since the PCF has a multi-layer space of the clad (multi-layer structure of a refractive index), a photonic band gap (PBG) as a forbidden band of a light is formed, and a light is confined in the core by the PBG.

The above-mentioned optical fiber (e.g., patent document 1) has the refractive index of the UV curing resin filled in the holes greater than that of a material constituting the clad part. Although the above-mentioned sealing method by using the UV curing resin is effective for PCF 50 having holes which are formed so as to have a honeycomb structure and have layers equal to or more than 3, if in the HAF 40 shown in FIG. 4 the refractive index of the UV curing resin filled in the holes is greater than that of the clad, a part around the core 41 becomes a side core, light leaks from the center core 41, and a mode field diameter, which is an effective propagation area of a light, becomes extremely large. Thus, a part filled by the UV curing resin is considered as a multi-mode fiber, a transmission loss becomes large, and when butt-connecting to an SMF, a connection loss becomes large since the mode field diameter does not match that of the SMF.

Additionally, although a resin filled in a plurality of holes is required to have several properties in order to process an end portion of an optical fiber having the holes around a core so as to be an optical connector, a conventional optical fiber (e.g., patent document 1) has not been considered with respect to properties of a UV curing optically-transparent resin filled in the holes (e.g., parameters other than a refractive index).

Thus, when an end portion of an HAF, in which a UV curing resin is filled, is processed (e.g., polished, connected to another optical fiber, optically-connectorized, etc.), the end portion may be damaged or the filled UV curing resin may be dented (e.g., sunken) at the end face.

SUMMARY OF THE INVENTION

In view of the foregoing and other exemplary problems, drawbacks, and disadvantages of the conventional methods and structures, an exemplary feature of the present invention is to provide an optical fiber, an end face structure of an optical fiber assembly, and an optical connector, which can reduce damage to an end face or a dent of a UV curing resin filled in the holes, and can be connected to a common SMF with a low loss.

According to one exemplary aspect of the invention, an optical fiber, includes:

a core;

a clad formed around the core, a plurality of holes being formed in the clad; and a UV curing optically-transparent resin which is filled in the holes and hardened, wherein the UV curing optically-transparent resin has a Young's modulus of 8 to 500 MPa after hardening.

According to another exemplary aspect of the invention, an end face structure of an optical fiber assembly, includes:

a first optical fiber including a core, a clad formed around the core, a plurality of holes being formed in the clad, and a UV curing optically-transparent resin which is filled in the holes and hardened, in which the UV curing optically-transparent resin has a Young's modulus of 8 to 500 MPa after hardening; and a second optical fiber including a solid single-mode optical fiber, wherein an end face of the first optical fiber is connected to an end face of the second optical fiber.

According to another exemplary aspect of the invention, an optical connector, includes:

an optical fiber including a core, a clad formed around the core, a plurality of holes being formed in the clad, and a UV curing optically-transparent resin which is filled in the holes and hardened, in which the UV curing optically-transparent resin has a Young's modulus of 8 to 500 MPa after hardening; and a ferrule to which an end portion of the optical fiber is fixed.

ADVANTAGES OF THE INVENTION

According to the present invention, it is possible to prevent damage at an end face and a dent (sinking or cavity) of a UV curing resin filled in a hole, and to connect to a common SMF with a low loss.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF THE EXEMPLARY EMBODIMENTS

Figure 1:
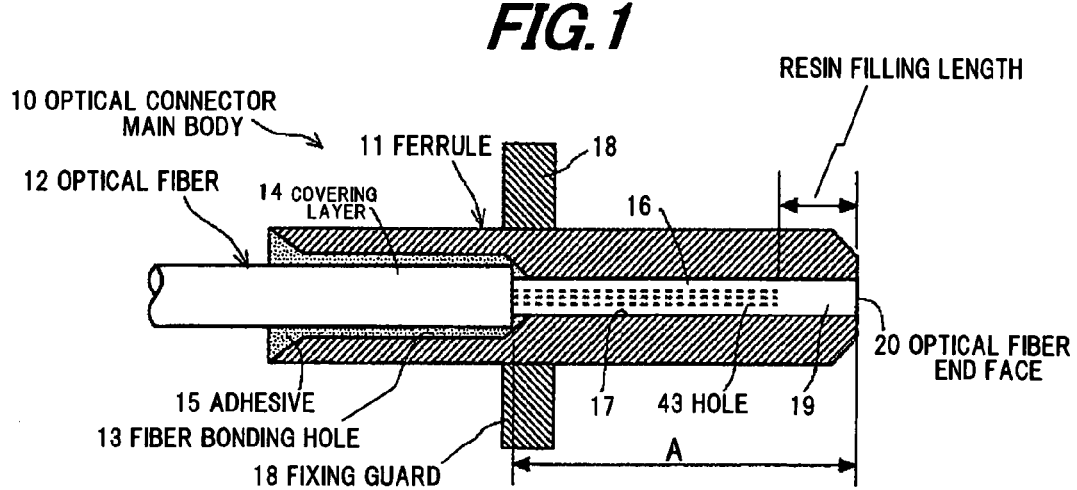
FIG. 1 is a sectional view showing an optical connector in an exemplary embodiment according to the present invention.

Referring now to the drawings, and more particularly to FIGS. 1-5, there are shown exemplary embodiments of the methods and structures according to the present invention.

Exemplary Embodiment

The present inventors have discovered that a viscosity of a resin precursor is important in order to secure a sufficient resin filling length for a grinding process, and that an elastic modulus of a resin after hardening is important in order to complete a grinding surface of a ferrule tip smoothly.

An optical fiber according to an exemplary embodiment is butt-connected to another optical fiber, or constitutes an optical connector and connected to another optical fiber.

FIG. 1 is a sectional view showing a part of an optical connector that an end portion of the optical fiber of this exemplary embodiment is optically connectorized.

As shown in FIG. 1, the optical connector includes an optical connector main body 10 in which an optical fiber 12 is mounted in a ferrule 11, and a connector housing (not shown) for containing the optical connector main body 10.

The ferrule 11 includes a through hole to insert the optical fiber 12 thereinto. The through hole includes a fiber bonding hole 13 to bond and fix a covering layer 14 of the optical fiber 12 by an adhesive 15, and a fiber end portion insert hole 17 (in FIG. 1, an exemplary length is 10 mm (="A" as shown) and an exemplary internal diameter is about 125 μm) which is formed so as to have a diameter less than that of the fiber bonding hole 13 and is inserted by an optical fiber end portion 16 in which the covering layer 14 is removed. In FIG. 1, a fixing guard 18 fixes the ferrule 11 to the connector housing (not shown).

Figure 4:
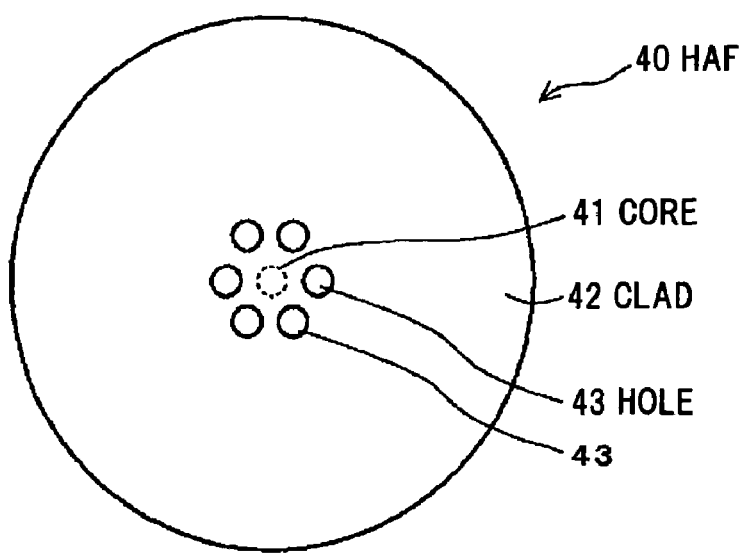
FIG. 4 is a sectional view showing a holey optical fiber.
Figure 5:
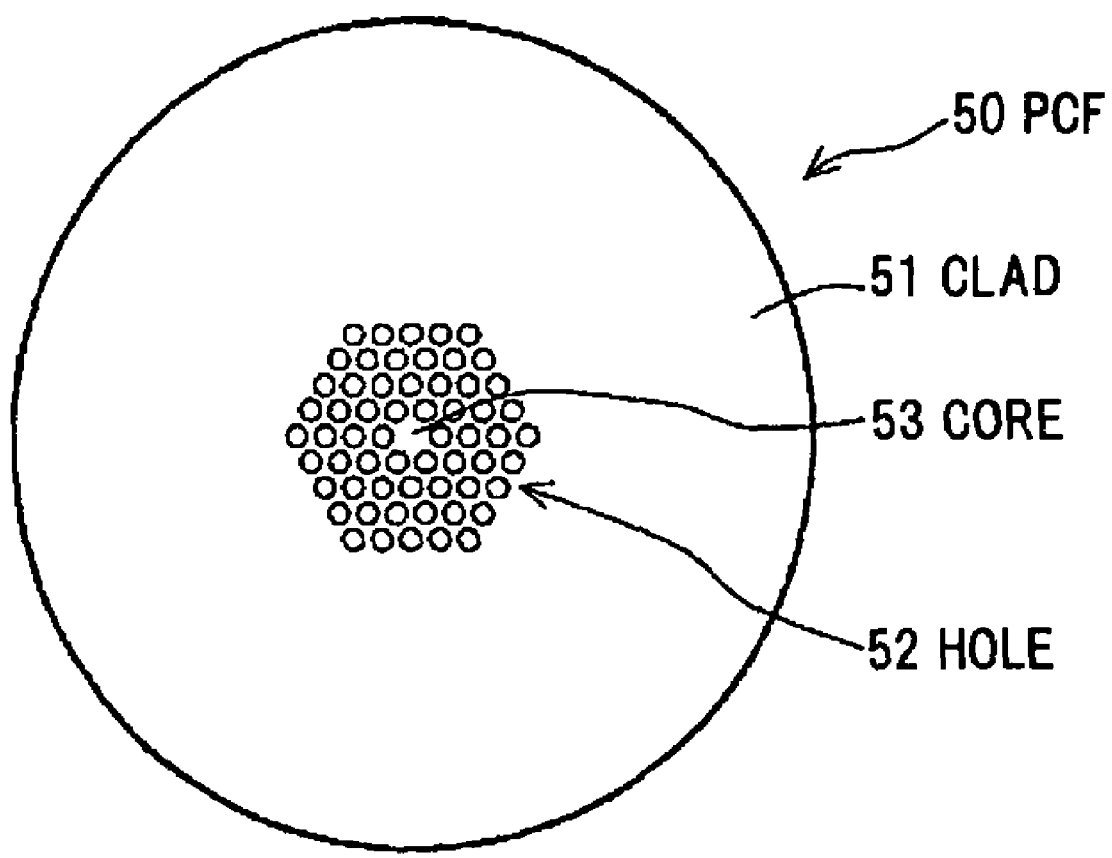
FIG. 5 is a sectional view showing a photonic crystal fiber.

As shown in FIG. 4, the optical fiber 12 according to this exemplary embodiment is a 6-hole holey optical fiber (hereinafter, "HAF") in which 6 holes 43 having a clad diameter of 125 μm are formed in the clad 42 around the core 41.

In the HAF 12 according to this exemplary embodiment, a UV curing optically-transparent resin (hereinafter, "UV curing resin") which has a Young's modulus of 8 to 500 MPa at 25° C. after curing, is filled and hardened at the fiber end portion 16, and an end face 20 thereof is grinded (polished).

The HAF 12 has a resin filling portion 19 in which the resin is filled in a longitudinal direction of the optical fiber from the end face 20, and the resin filling length is exemplarily more than 0.3 mm.

The UV curing resin exemplarily has a viscosity of the precursor solution (state before hardening) equal to or less than 5 Pa·s at a room temperature (25° C.).

A refractive index of the UV curing resin before hardening is exemplarily less than that of a glass of a hole portion (i.e., a clad around a filled UV curing resin) in a practical temperature range (−30 to +70° C.). Preferably, the refractive index of the UV curing resin is less than that of a silica glass (pure silica) constituting the clad 42 in the practical temperature range (−30 to +70° C.).

Next, a production procedure of an FC connector using the optical fiber 12 is described.

Figure 2:
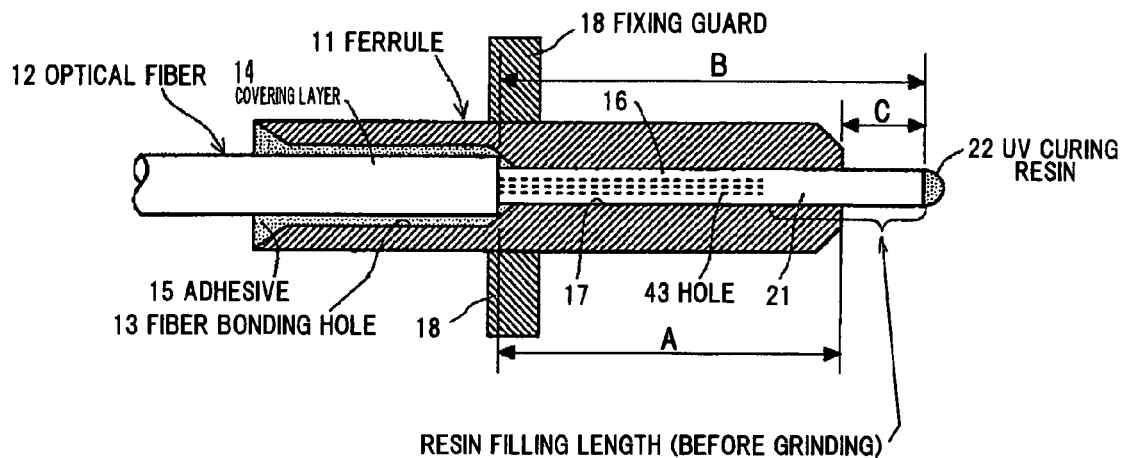
FIG. 2 is a sectional view showing a state after filling a resin and before grinding (e.g., polishing) in an order of manufacturing of the optical connector of FIG. 1.

First of all, after removing the covering of the end portion of the HAF 12, the HAF 12 is cut by a special fiber cutter, and a cut fiber (optical fiber end portion) which has a length of about 12.0 mm (="B" as shown in FIG. 2) from the fiber end portion to an edge of the removed covering, is obtained. The special fiber cutter is preliminarily adjusted so that a cutter blade thereof can be located at a location where there is about 12.0 mm from the edge of the removed covering.

After obtaining the cut fiber, a slight amount of UV curing resin is coated at an end face thereof by a needle, etc. The UV curing resin may be an epoxide-based UV curing adhesive including a fluorine which is adjusted to have a viscosity of the precursor solution of 1.5 Pa·s and a refractive index of 1.42, after hardening, with respect to a wavelength of 1.3 μm.

After coating the UV curing resin at the end face, it is held for about 90 seconds so that the UV curing resin can permeate into the holes by a capillary phenomenon. In the HAF 12 according to this exemplary embodiment using the UV curing resin which has the diameter of holes of 10 μm and the viscosity of the precursor solution of 1.5 Pa·s, the resin filling length after 90 seconds is 4 to 5 mm. Since the holding time (i.e., time necessary for permeation of the resin) depends on a viscosity of a precursor solution, a surface tension, and a diameter of a hole, when a type of the UV curing resin and a diameter of a hole are different from those of this exemplary embodiment, the holding time would be better decided on a case by case basis.

A surplus UV curing resin which remains at the end face is wiped away by a gauze, the precursor solution permeating is hardened by an irradiation of UV rays from a side face of a resin filling portion 21 (referring to FIG. 2) of the HAF 12. A Young's modulus after hardening is 90 MPa at room temperature (25° C.)

After a surface of the optical fiber end portion (a part of a glass fiber in which a covering thereof is removed) is wiped away and cleaned by a gauze impregnating an alcohol, and the HAF 12 is inserted into the FC connector ferrule 11, and bonded by the adhesive (epoxy adhesive) 15.

As shown in FIG. 2, in this exemplary embodiment, since a length of the optical fiber end portion insert hole 17 (internal diameter of about 125 μm) of the FC connector ferrule 11 is 10.0 mm (="A" as shown), when the optical fiber end portion 16 is bonded, the HAF 12 is bonded such that the optical fiber end portion 16 protrudes 2 mm (="C" as shown) from a tip of the ferrule 11. In the Figures, a UV curing resin 22 may be a UV curing resin attached to the optical fiber end face and hardened (hardened without being wiped away and cleaned).

After the optical fiber end portion 16 is bonded, the tip of the ferrule 11 is grinded (polished) by a common end face arrangement process of an optical fiber, the optical fiber end face 20 shown in FIG. 1 is formed, and the optical connector main body 10 is obtained. The optical connector is obtained by incorporating the optical connector main body 10 into the connector housing.

Although the optical fiber end portion 16 in the ferrule 11 cannot be viewed, the resin filling length before grinding is about 5 mm, and the resin filling length after completing is about 3 mm, since the optical fiber end portion of about 2 mm protruding from the tip of the ferrule is removed through the grinding process.

Although a part of the fiber end face 20 after grinding, which is filled by the UV curing resin, is slightly dented (sunken) in comparison to a part of the clad of the fiber end face 20, the dent is less than 0.5 μm, and an attachment of a grind waste to the grinding surface is not observed.

When a connection loss with respect to an FC connector containing an HAF and an FC connector containing a common SMF is measured for inspection, the connection loss is 0.18 dB in a wavelength of 1.31 μm, and 0.16 dB in a wavelength of 1.55 μm. Further, a return loss is −55 dBm, and the connection loss of each case is equal to a connection loss in a case that common SMFs are connected.

Next, a reason of a range of an elastic modulus of the UV curing resin, the resin filling length, and a viscosity of the precursor solution of the UV curing resin is described, respectively.

Table 1 represents a result of observing an optical fiber end face 20 which is bonded to a ferrule and grinded after several kinds of epoxy UV curing resins having a Young's modulus, after hardening, in a range of 1 to 300 MPa (e.g., 1, 6, 8, 11, 25, 50, 120, 300) are filled in the HAF and hardened.

TABLE 1

Condition of grinding surface after filling various kinds of UV curing resins

| | Resin Young's modulus (MPa) | | | | | | | |
|---|---|---|---|---|---|---|---|---|
| | 1 | 6 | 8 | 11 | 25 | 50 | 120 | 300 |
| Damage of grinding surface | YES | YES | NO | NO | NO | NO | NO | NO |
| Dent of resin part (μm) | More than 5 | 2 | <0.5 | <0.5 | <0.5 | <0.5 | <0.5 | <0.5 |

According to the result of the observation, in an optical fiber using the UV curing resin having the elastic modulus of 1 MPa and an optical fiber using the UV curing resin having the elastic modulus of 6 MPa, a grinding waste arising during grinding breaks into the resin and remains therein, and a glass surface is damaged due to the grinding waste breaking into the UV curing resin. If the Young's modulus of the UV curing resin is small, then a whetstone or a grain of a silica which breaks into the end face sealed by the resin in an early stage of a rough grinding, may be dropped from the resin in a next stage of a normal grinding and a final grinding, and the fiber end face is deeply damaged.

Further, in the optical fibers which use the UV curing resin having the elastic modulus of 1 MPa and 6 MPa, a dent equal to or more than 2 μm arises in a hole portion (resin filling portion 19) filled by the UV curing resin, and the grinding surface is contaminated by flowing of the UV curing resin to a glass surface other than the hole.

On the other hand, in an optical fiber which is filled by a UV curing resin having an elastic modulus equal to or more than 8 MPa, no damage arises due to grinding, a dent at the resin filling portion 21 is less than 0.5 μm, and the optical fiber can be grinded in the same manner as a common SMF without any problems.

Additionally, an upper limit of the Young's modulus after hardening is exemplarily 500 MPa. This is because, if the UV curing resin has a Young's modulus more than 500 MPa after hardening, then the UV curing resin is likely to peel off from the inside face (adhesion interface) of the holes regardless of the resin filling length since the amount of resin contraction during the hardening increases.

Table 2 represents a result of observing an optical fiber end face which is bonded to a ferrule and grinded after several kinds of epoxy UV curing resins having a Young's modulus, after hardening, in a range of 8 to 300 MPa (e.g., 8, 25, 50, 300) are filled in the HAF and cured, while each of resin filling lengths is varied in a range of 0.1 to 3 mm.

TABLE 2

Correlation between filling length of UV curing resin and separation occurrence of adhesive interface (just after grinding)

| | | Resin filling length (mm) | | | | | | |
|---|---|---|---|---|---|---|---|---|
| | | 0.1 | 0.2 | 0.3 | 0.5 | 1.0 | 2.0 | 3.0 |
| Resin Young's modulus (MPa) | 8 | ○ | ○ | ○ | ○ | ○ | ○ | ○ |
| | 25 | ○ | ○ | ○ | ○ | ○ | ○ | ○ |
| | 50 | X | ○ | ○ | ○ | ○ | ○ | ○ |
| | 300 | X | X | ○ | ○ | ○ | ○ | ○ |

Note)
X: Occurrence of boundary separation,
○: no occurrence of boundary separation When the filling length is 0.1 mm with respect to the resin Young's modulus of 50 MPa, and when the filling length is equal to or less than 0.2 mm with respect to the resin's Young's modulus of 300 MPa, a separation (separation occurrence of an adhesive interface) of the UV curing resin around holes arises, a polishing solution enters into the separation during grinding, and then the polishing solution oozes (e.g., flows) therefrom.

Further, Table 3 represents a result of confirming whether or not a separation arises, after providing a temperature cycle of −30 to +70° C. to these ferrules 50 times. Whether or not the separation arises is determined by whether a polishing solution oozes after the polishing solution is attached to an end face and wiped away by a nonwoven fabric.

TABLE 3

Correlation between filling length of UV curing resin and separation occurrence of adhesive interface (after cycling of −30 to +70° C. × 50)

| | | Resin filling length (mm) | | | | | | |
|---|---|---|---|---|---|---|---|---|
| | | 0.1 | 0.2 | 0.3 | 0.5 | 1.0 | 2.0 | 3.0 |
| Resin Young's modulus (MPa) | 8 | X | ○ | ○ | ○ | ○ | ○ | ○ |
| | 25 | X | X | ○ | ○ | ○ | ○ | ○ |
| | 50 | X | X | ○ | ○ | ○ | ○ | ○ |
| | 300 | X | X | ○ | ○ | ○ | ○ | ○ |

Note)
X: Occurrence of boundary separation,
○: no occurrence of boundary separation When the resin filling length is 0.1 mm, a separation arises in all samples regardless of the Young's modulus. When the resin filling length is 0.2 mm, a separation around the holes newly arises in the samples having a Young's modulus of 25 MPa and 50 MPa.

According to the above results, although damage to the grinding surface and a dent of the resin do not arise by using the UV curing resin having an elastic modulus equal to or more than 8 MPa, in order to prevent the boundary separation of the UV curing resin, the filling length of the UV curing resin is exemplarily equal to or more than 0.3 mm.

Figure 3:
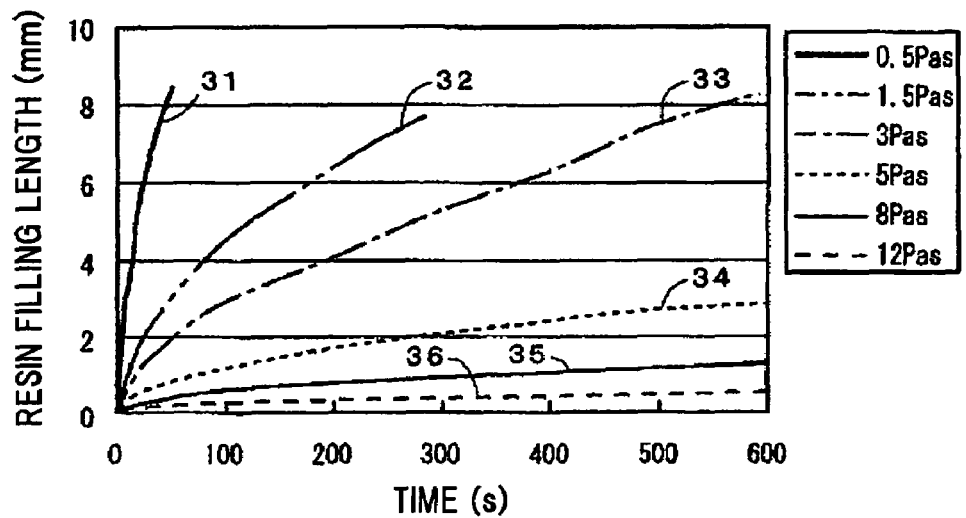
FIG. 3 is a graph showing a correlation between a viscosity of a precursor solution and a resin filling length.

FIG. 3 represents a result that several kinds of epoxy UV curing resins which have a viscosity of a precursor solution in a range of 0.5 to 12 Pa·s (e.g., 0.5, 1.5, 3, 5, 8, and 12 Pa·s) are prepared, and that a time dependency of the resin filling length (permeating length) by a surface tension into a hole having a diameter of 10 μm is measured.

As shown in FIG. 3, the resin filling length, 10 minutes after starting to fill the resin, is 3.0 mm with respect to an optical fiber of 5 Pa·s (reference numeral 34 in the graph), 1.3 mm with respect to an optical fiber of 8 Pa·s (reference numeral 35 in the graph), and 0.6 mm with respect to an optical fiber of 12 Pa·s (reference numeral 36 in the graph), respectively. Further, the resin filling length with respect to optical fibers having the viscosity of the precursor solution of 0.5 Pa·s (reference numeral 31 in the graph), 1.5 Pa·s (reference numeral 32 in the graph), and 3 Pa·s (reference numeral 33 in the graph) is more than 8 mm, within 10 minutes after starting to fill the resin.

According to the result, if a lower limit of the resin filling length, which is practically required, is set to almost 3 mm, and if an upper limit of an operating time is set to within 10 minutes, then an upper limit of the viscosity of the precursor solution is exemplarily 5 Pa·s at 25° C.

According to the optical fiber 12 of this exemplary embodiment, the optical fiber end face 20 can be grinded without damage in the same manner as a common SMF by using the UV curing resin having the Young's modulus in a range of 8 to 500 MPa, and thereby a connection loss in a case of connecting to another optical fiber can be suppressed to a low level. Further, a grinding productivity equal to the common SMF can be obtained without decreasing a yield of a grinding process.

Further, the optical fiber 12 of this exemplary embodiment can be butt-connected to a common SMF with a low loss within a range of an operating temperature without increasing of a mode field diameter, by making the UV curing resin have a refractive index at −30° C. after hardening, lower than that of a glass of a hole portion.

The optical fiber 12 of this exemplary embodiment can prevent a resin separation inside of the holes during a grinding process or a temperature cycle and can obtain a highly-reliable HAF connector by making the UV curing resin have the resin filling length equal to or more than 0.3 mm.

The optical fiber 12 of this exemplary embodiment can fill (permeate) the precursor solution into the holes in a short time by making the UV curing resin have a viscosity of the precursor solution equal to or less than 5 Pa·s, and can contribute to shortening a time of an optical connector assembly process and reducing a cost of an optical connector.

Additionally, the optical fiber 12 of this exemplary embodiment constitutes an end face structure by connecting to a common (solid) single mode optical fiber. According to the end face structure in which the HAF 12 and the SMF are connected, the end face structure can be made with an excellent productivity since the HAF 12 has an end face formed without a grinding damage, as mentioned above, and the HAF 12 can be butt-connected to the SMF with a low loss since a mode field diameter of the HAF 12 in a vicinity of the connecting end face of the HAF 12 can be equal to a mode field diameter of the SMF.

According to the optical connector of this exemplary embodiment, the optical connector can be produced with an excellent productivity since the HAF 12 inserted thereinto has the end face formed without a grinding damage, as mentioned above, and can be optically connected to another optical connector with a low loss.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

It is noted that Applicant's intent is to encompass equivalents of all claim elements, even if amended later during prosecution.

What is claimed is:

1. An optical fiber, comprising:
   a core;
   a clad formed around said core, a plurality of holes being formed in said clad; and
   a UV curing optically-transparent resin which is filled in said holes and hardened,
   wherein said UV curing optically-transparent resin has a Young's modulus of 8~500 MPa after hardening, and
   wherein said UV curing optically-transparent resin has a viscosity of a precursor solution equal to or less than 5 Mpa·s.

2. The optical fiber according to claim 1, wherein:
   said UV curing optically-transparent resin has a resin filling length equal to or more than 0.3 mm.

3. The optical fiber according to claim 1, wherein:
said UV curing optically-transparent resin has a refractive index less than that of said clad located at an end portion of said optical fiber in a predetermined temperature range.

4. The optical fiber according to claim 1, wherein:
said UV curing optically-transparent resin has a refractive index less than that of a silica glass in a predetermined temperature range.

5. An end face structure of an optical fiber assembly, comprising:
a first optical fiber comprising a core, a clad formed around said core, a plurality of holes being formed in said clad, and a UV curing optically-transparent resin which is filled in said holes and hardened, in which said UV curing optically-transparent resin has a Young's modulus of 8~500 MPa after hardening; and
a second optical fiber comprising a solid single-made optical fiber,
wherein an end face of said first optical fiber is connected to an end face of said second optical fiber, and
wherein said UV curing optically-transparent resin has a viscosity of a precursor solution equal to or less than 5 Mpa·s.

6. The end face structure according to claim 5, wherein:
said UV curing optically-transparent resin has a resin filling length equal to or more than 0.3 mm.

7. The end face structure according to claim 5, wherein:
said UV curing optically-transparent resin has a refractive index less than that of said clad locating at an end portion of said optical fiber in a predetermined temperature range.

8. The end face structure according to claim 5, wherein:
said UV curing optically-transparent resin has a refractive index less than that of a silica glass in a predetermined temperature range.

9. An optical connector, comprising:
an optical fiber comprising a core, a clad formed around said core, a plurality of holes being formed in said clad, and a UV curing optically-transparent resin which is filled in said holes and hardened, in which said UV curing optically-transparent resin has a Young's modulus of 8~500 MPa after hardening; and
a ferrule to which an end portion of said optical fiber is fixed,
wherein said UV curing optically-transparent resin has a viscosity of a precursor solution equal to or less than 5 MPa·s.

10. The optical connector according to claim 9, wherein:
said UV curing optically-transparent resin has a resin filling length equal to or more than 0.3 mm.

11. The optical connector according to claim 9, wherein:
said UV curing optically-transparent resin has a refractive index less than that of said clad locating at an end portion of said optical fiber in a predetermined temperature range.

12. The optical connector according to claim 9, wherein:
said UV curing optically-transparent resin has a refractive index less than that of a silica glass in a predetermined temperature range.

* * * * *